US011037389B1

(12) United States Patent
Coutts

(10) Patent No.: US 11,037,389 B1
(45) **Date of Patent: *Jun. 15, 2021**

(54) SYSTEM CONTROLLED BY DATA BEARING RECORDS

(71) Applicant: Unisyn Voting Solutions, Inc., Vista, CA (US)

(72) Inventor: McDermot Coutts, San Diego, CA (US)

(73) Assignee: Unisyn Voting Solutions, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,338

(22) Filed: Dec. 18, 2019

Related U.S. Application Data

(63) Continuation of application No. 16/161,238, filed on Oct. 16, 2018, now Pat. No. 10,521,993, which is a continuation-in-part of application No. 15/663,941, filed on Jul. 31, 2017, now abandoned.

(60) Provisional application No. 62/369,856, filed on Aug. 2, 2016.

(51) Int. Cl.

| | |
|---|---|
| ***G07C 13/00*** | (2006.01) |
| ***G06F 3/0488*** | (2013.01) |
| ***G06F 3/0482*** | (2013.01) |
| ***G06F 3/0489*** | (2013.01) |
| ***G06F 3/0485*** | (2013.01) |
| ***G06F 3/02*** | (2006.01) |

(52) U.S. Cl.
CPC ............. *G07C 13/00* (2013.01); *G06F 3/021* (2013.01); *G06F 3/0482* (2013.01); *G06F 3/0485* (2013.01); *G06F 3/0489* (2013.01); *G06F 3/04883* (2013.01)

(58) Field of Classification Search
CPC ....... G07C 13/00; G06F 3/021; G06F 3/0489; G06F 3/0485; G06F 3/0482; G06F 3/04883
See application file for complete search history.

(56) References Cited

U.S. PATENT DOCUMENTS

| | | | | |
|---|---|---|---|---|
| 10,521,993 | B1 * | 12/2019 | Coutts .................... | G07C 13/00 |
| 2009/0173778 | A1 * | 7/2009 | Cummings ............ | G07C 13/02 235/51 |
| 2010/0017274 | A1 * | 1/2010 | Liesenfelt ............. | G07C 13/00 705/12 |

* cited by examiner

*Primary Examiner* — Matthew Mikels
(74) *Attorney, Agent, or Firm* — Ralph R. Jocke; Walker & Jocke

(57) ABSTRACT

A machine that operates responsive at least in part to data bearing records (10) presents user selection contest options to users through at least one output device such as a display (14), and receives user contest option selection inputs and machine instruction inputs through input devices such as a touch screen overlay (16), a keypad (18) or other input devices. The machine may further include a device that reads data bearing records such as a bar code reader or a card reader (30). The machine records the user's selections and also user/machine interaction data which describes each user interaction with the machine during the user's session with the machine to facilitate verifying proper operation of the machine and recording of user selections.

24 Claims, 7 Drawing Sheets

10
34
16
30
32
12
14
20
18
36
22
24
26
28

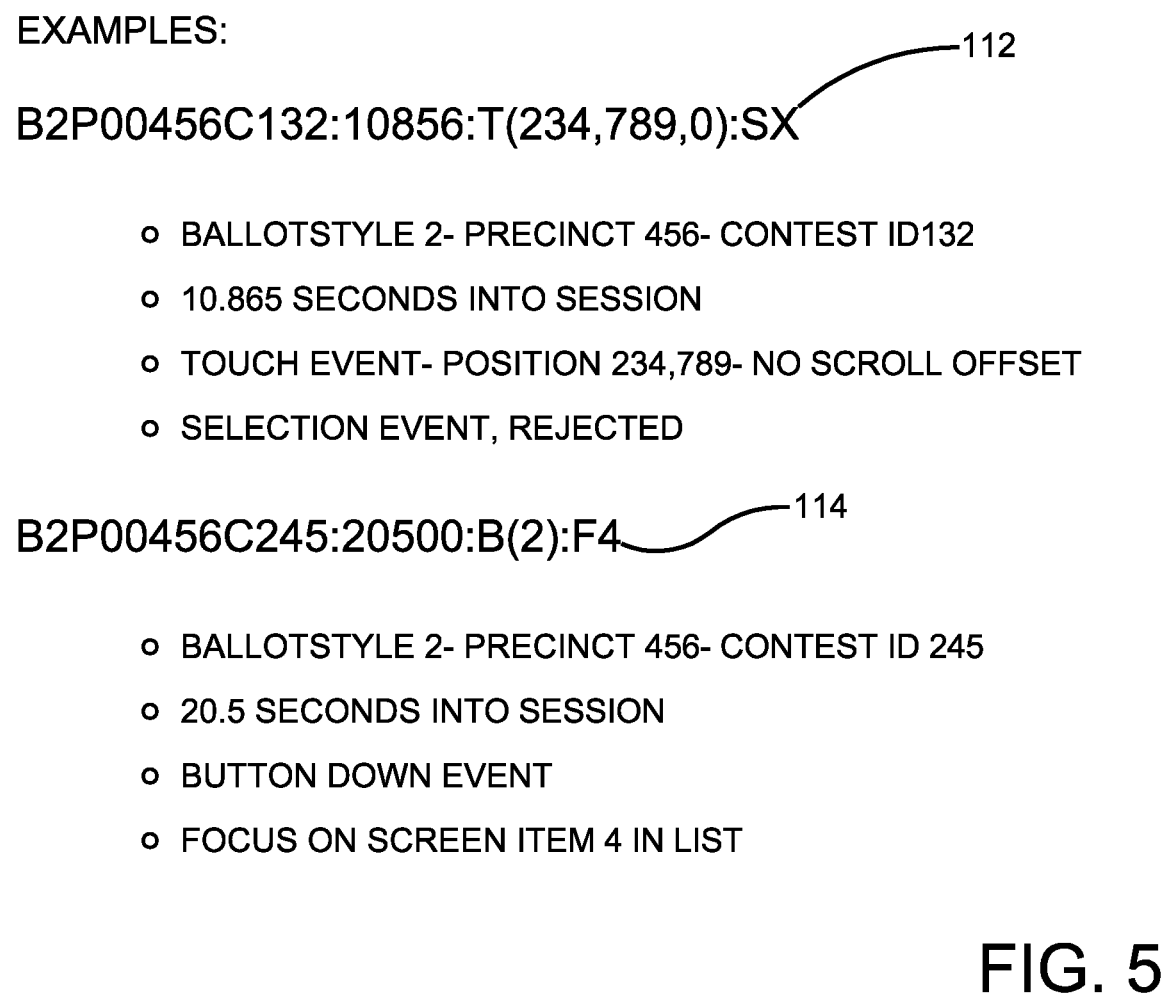

EXAMPLES:

B2P00456C132:10856:T(234,789,0):SX — 112

- BALLOTSTYLE 2- PRECINCT 456- CONTEST ID132
- 10.865 SECONDS INTO SESSION
- TOUCH EVENT- POSITION 234,789- NO SCROLL OFFSET
- SELECTION EVENT, REJECTED

B2P00456C245:20500:B(2):F4 — 114

- BALLOTSTYLE 2- PRECINCT 456- CONTEST ID 245
- 20.5 SECONDS INTO SESSION
- BUTTON DOWN EVENT
- FOCUS ON SCREEN ITEM 4 IN LIST

FIG. 5

SYSTEM CONTROLLED BY DATA BEARING RECORDS

TECHNICAL FIELD

Exemplary arrangements include systems controlled by data bearing records which may be classified in CPG G 06 K 17/00; USPC 235/375.

BACKGROUND

User interaction with machines is a common occurrence. Often user machine interaction involves the machine presenting the user with selectable options and choices, and the user providing inputs which indicate user selections. The user selections may be indicative of user preferences related to numerous available contest options, which selections are recorded as data bearing records for purposes of making collective determinations, such as in voting. It is desirable to assure that machines and systems that produce records of such user input selections do so in a manner that is accurate.

Machines and systems that operate responsive to data bearing records and that produce data bearing records of user input selections may benefit from improvements.

SUMMARY

Exemplary arrangements include systems and methods which operate responsive at least in part to data bearing records and which produce data bearing records related to user selections that are input to a machine along with user/machine interaction data related to such selections, which user/machine interaction data is usable to verify that the input user selections are accurately recorded.

BRIEF DESCRIPTION OF DRAWINGS

FIG. 5 includes two examples of user/machine interaction data elements and the content of each.

DETAILED DESCRIPTION

Figure 1:
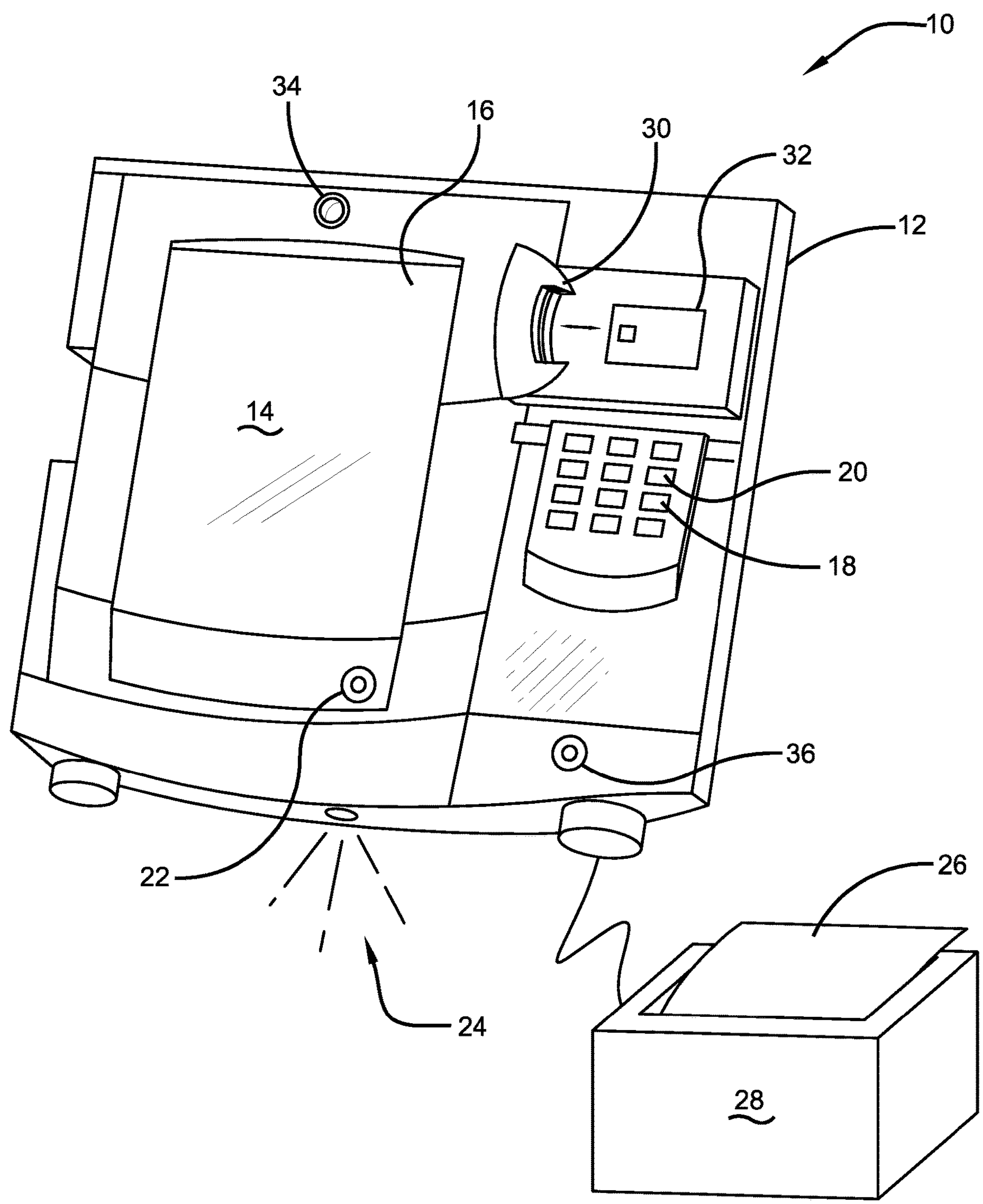
FIG. 1 is a right top isometric front view of an exemplary machine through which user selections may be presented and input in operative connection with a printer.

Referring now to the drawings and particularly to FIG. 1, there is shown therein exemplary machine generally indicated 10 that operates responsive at least in part to data bearing records. In some exemplary arrangements the machine may be of the type shown in U.S. patent application Ser. No. 15/663,941 and/or 62/369,856, the disclosures of each of which are incorporated herein by reference in their entirety. The exemplary machine 10 includes a housing 12. The housing 12 includes a display 14 that serves as an output device. The display 14 is associated with a touch detection overlay 16 so as to provide a touch screen. The touch screen overlay may be of the resistive, capacitive, acoustic wave or other type suitable for detecting the position where a user's finger contacts the surface of the touch detection overlay. Exemplary arrangements may also detect positions of multiple concurrent finger contacts and finger movements or gestures. The touch detection overlay in combination with the touch screen display serves as an input device.

The exemplary machine further includes a keypad 18. The keypad 18 serves as an input device and includes a plurality of manually actuatable buttons 20 through which a user may selectively provide inputs.

The exemplary machine further includes an audio output device which comprises a headphone jack 22 in the exemplary arrangement. In the exemplary arrangement, the headphone jack is releasibly operatively engageable with headphones. Headphones may be worn by a blind user or other person with disabilities requiring audio assistance who operates the machine. The user may provide selections in response to visual or audio voice guidance outputs provided by the machine. Although a headphone jack is described in the exemplary arrangement, other arrangements may include wireless audio interfaces such as NFC or Bluetooth ports that are operative to communicate with wireless headphones or a user's smart phone or other device through which a user may receive audio or other user instructions.

The exemplary machine further includes a data bearing record reading device such as a bar code reader 24. In exemplary arrangements, the bar code reader may be operative to read bar code indicia included on a token, such as an article or card which identifies a user category, residence, jurisdiction or other user related information which determines at least some machine outputs to the user. The indicia included on such a token may be utilized in some configurations to identify contest or other user selections that are to be presented to the user. In some arrangements, the token provided for this purpose may be utilized by a machine attendant, poll worker or other supervisory individual to cause the machine to be configured to present to the user the output contest selection options which are to be presented to a user based on a user's information, for example, the user's residence in a particular geographical area or other qualification to provide selection inputs in response to the particular contest options that the machine will present in response to reading the bar code indicia. In other arrangements, the bar code reader 24 may be operative to read a bar code or other indicia included on a record such as a paper ballot 26. This approach may be used when the machine is utilized to mark user selections on the pre-printed paper record such as a ballot through the use of an associated printer 28. An approach of this type may be utilized when the machine is configured to operate as a record marking device for marking paper records in the form of ballots that can be utilized to enable blind users or other users with disabilities to mark such paper records without assistance. It should be understood that other data bearing record readers such as bar code readers may be operative to read one dimensional bar codes, two dimensional bar codes, QR codes or other suitable types of readable indicia as is appropriate to carry out the particular functionality which is to be achieved.

In other arrangements, the data bearing record reader such as the bar code reader may be operative to read indicia which indicates contest selections that a user had previously input to a device. Such a device may include a smart phone, tablet or other mobile device that is operable by the user. In exemplary arrangements these selections previously input by the user of the device comprise records that can be read by reading of the indicia from the device such as from a screen thereof. The read indicia corresponding to the user selections output from the mobile device may be presented to the user through the display of the machine. The user may then operate the machine to indicate that the output contest selections correspond to the selections that the machine user wishes to make through interactions with the machine. The user can then provide inputs to the machine where the machine records the user's contest or other selections. The user may also change their contest selections through inputs to the machine before the selections are recorded as final user selections. In other arrangements, the bar code reader may be operative to read record indicia from a user device or other item which indicates user preferences in connection with the operation of the machine. Such user preferences may include the font size, the contrast of the display, the operation of certain features or devices or other things that correspond to user machine operation preferences. The reading of such record indicia by the bar code reader or other data bearing record reader may cause the machine to operate in a manner that the user has indicated through their portable device is preferable for the particular user. This approach may avoid the need for the user to have to provide inputs to the machine to cause the machine to operate in a desired manner or mode, and may facilitate the ability of the user to use the machine unassisted or generally without assistance from others. Of course these approaches are exemplary and in other arrangements, other approaches may be used.

The exemplary machine further includes a device that reads data bearing records which comprises a card reader 30. The card reader 30 serves as an input device in some exemplary arrangements for purposes of reading a data bearing record such as an article or card 32. The exemplary card or other article 32 may include a memory with stored data thereon. The memory may provide to the machine information about the particular contest selection options, such as contest selection options that are to be presented to the user by the machine. In some exemplary arrangements, the data bearing record in the form of a card or other article, may include a computer chip which is programmable by machine attendants such as poll workers to include data corresponding to the particular set of user selections applicable to a machine user, such as a voting jurisdiction or survey data. In other arrangements, the card may include data indicative of other information which is operative to cause the machine to output to the user, contest selection options and machine selection options that are appropriate for the particular user. In some exemplary arrangements, the card reader 30 may be used in lieu of the bar code reader input device 24 and vice versa.

The exemplary machine further includes an input device in the form of at least one camera 34. In the exemplary arrangement, the at least one camera may serve as an eye tracking camera that is operative to capture information about the position and orientation of a machine user's eyes in viewing the display 14. The at least one eye tracking camera in conjunction with associated circuitry is operative to determine the particular location on the display screen at which the user is looking. In some exemplary arrangements, the eye tracking camera may comprise multiple disposed cameras to facilitate observation of the orientation of both eyes of a user in resolving the particular display object, such as an icon or name or a selection box, at which the user is currently looking. In exemplary arrangements, the eye tracking cameras may also be operative to detect the user focusing their gaze on a particular selection option and taking an action which corresponds to making a contest selection. This may include, for example, the user blinking one or both eyes. Alternatively in other arrangements, the machine may be operative to cause the user selection to be recorded if a user gazes at a particular display object for more than a set period of time. Of course it should be understood that these approaches are exemplary and in other arrangements, other approaches may be used.

The exemplary machine further includes a binary user interface 36. In the exemplary arrangement, the interface is in operative connection with a binary device such as a sip and puff input device that is operative to connect to a pressure sensing apparatus that a user can actuate using their mouth and lungs. In other exemplary arrangements, the binary input device may include a foot pedal which may be operated by a user's foot to provide selection inputs to the machine. In other arrangements, the binary input device may include a gel switch which can be compressed or otherwise actuated by a user to provide binary inputs in response to outputs by the machine. Such a binary input interface may be used to enable a disabled user to provide user inputs in response to user contest selection options so as to provide inputs that respond to both contest options and machine instruction options.

It should be understood that generally exemplary machines will not include all the different input and output devices that have been described in connection with exemplary machine 10. Generally, a machine will have a subset of these input and output devices as is appropriate for the nature of the machine operation that is to be accomplished. However, in other arrangements, exemplary machines may include other types of input and output devices as is appropriate for the types of users that the machine is made to accommodate.

Figure 2:
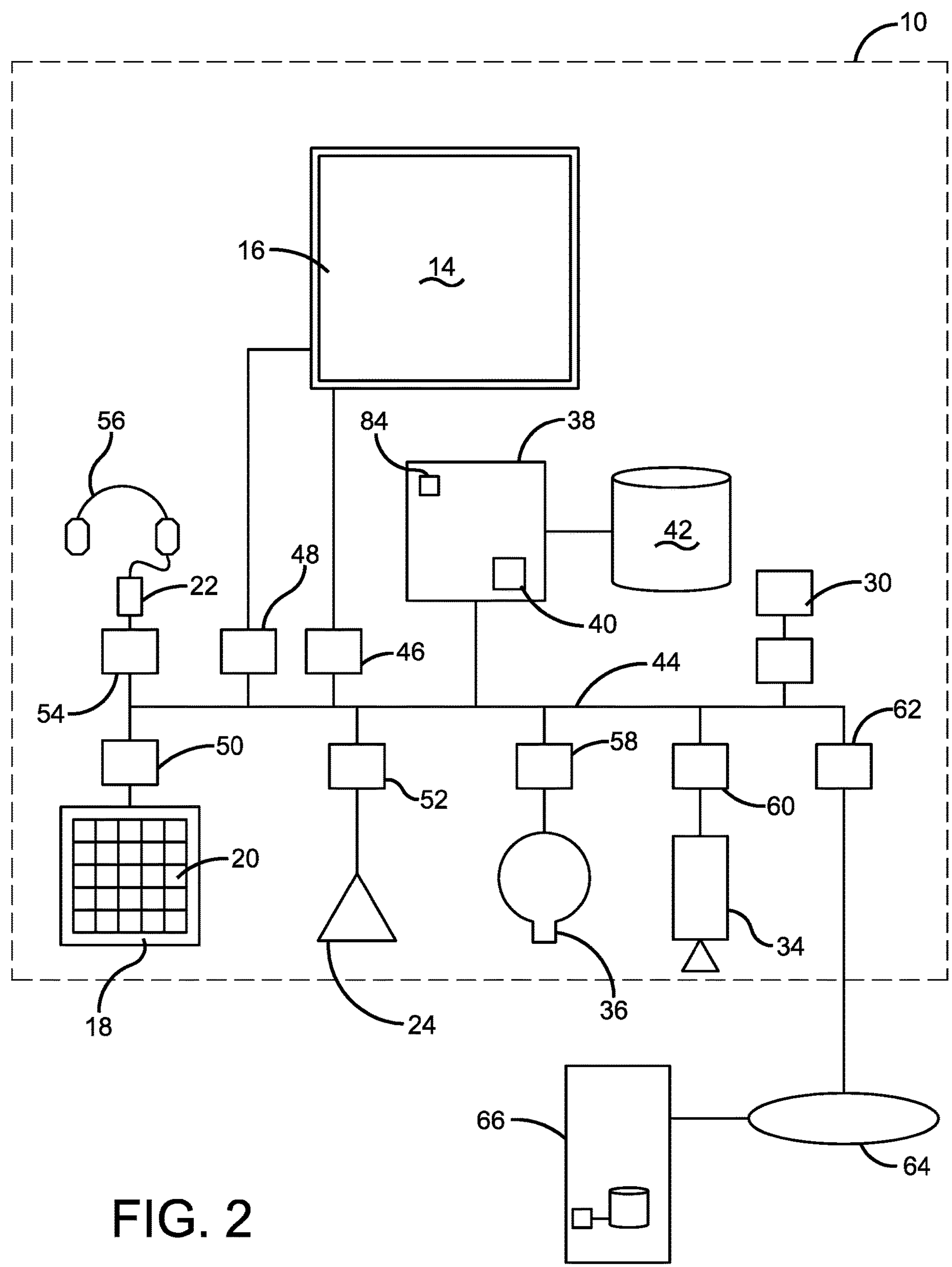
FIG. 2 is a schematic view of functional components included in an exemplary machine.

FIG. 2 is a schematic view of the components included in the exemplary machine 10. In the exemplary arrangement, the machine includes a circuit 38. Although one circuit is shown, it should be understood that exemplary machines may include a plurality of circuits. Therefore reference to a circuit herein will also be deemed to include a plurality of operatively connected circuits. In the exemplary arrangement, circuit 38 is a processor circuit including at least one processor chip or chip sets 40 that are operative to execute computer executable instructions. The circuit 40 includes at least one data store 42. Data store 42 includes one or more types of suitable storage media. Such data storage media may include computer readable data and computer executable instructions which may include non-transitory computer executable instructions that constitute programs for operating the machine. It should be understood that such data stores may include suitable machine readable mediums including solid state storage medium, magnetic storage medium, optical storage medium, random access memory, programmable read-only memory, hard drive storage memory or other suitable memory medium that can store computer executable instructions and data.

Further it should be understood that the circuit 38 may include suitable circuits and components in the form of electronic hardware, software and components to carry out the functions described herein. Such circuitry may include circuits including, for example, an application specific integrated circuit (ASIC), a field programmable gate array (FPGA), solid state microprocessors, organic microprocessors or similar devices that are suitable for carrying out the functions described herein. Structures for processor circuits may include, correspond to and utilize the principles described in the textbook entitled *Microprocessor Architec-*

*ture, Programming and Application with the* 8085, Ramush S. Gaonker (Prentice Hall 2002) which is incorporated herein by reference in its entirety. Of course it should be understood that these processors, circuit structures and other structures are exemplary and in other arrangements, other circuit structures for storing, processing, resolving and outputting signals may be used. Processor circuits and the like may alternatively be referred to herein as circuits, circuitry or processors.

In the exemplary arrangement, the circuit 38 is in operative connection with one or more buses 44. Suitable buses are used to communicate with the input and output devices previously mentioned. As represented in FIG. 2, the circuit 38 communicates with the display 14 through a driver interface 46. A touch screen interface 48 is utilized for communication with the touch detection overlay 16. A keypad interface 50 is utilized to communicate with the keypad 18. The bar code reader 24 communicates with the circuit 38 through an interface 52. An audio interface 54 is used to provide communication with the headphone jack 22 or wireless audio port or other item suitable to communicate with headphones schematically indicated 56 or other device that is utilized to provide outputs to the machine user.

The binary input device interface 36 is in communication with the one or more circuits 38 through an interface 58. The eye tracking camera or cameras 34 communicate via an interface 60. Of course it should be understood that the types of interfaces utilized varies with the particular type of input and output device and that the interfaces and the devices themselves may include processor circuitry and other circuitry that is included in this component of the machine for purposes of carrying out the indicated functions. Further, it should be understood that these devices and interfaces are exemplary and in other arrangements, other devices and interfaces may be used.

The exemplary machine 10 that operates responsive at least in part to data bearing records, further includes a network interface 62. In exemplary arrangements the network interface 62 may include a suitable network interface card and/or chip sets for providing wired or wireless communications from the machine with a network schematically indicated 64. In some exemplary arrangements, the network 64 may comprise one or more local networks which enable the machine to communicate with a computer schematically indicated 66 that receives the totals of user selections or other information from the machine. In other arrangements, the machine 10 may be connectable through wide area networks so as to enable the delivery of user selection results from the machine to a remote facility where results may be tallied. Of course it should be understood that in some arrangements both local and wide area networks may be employed or intermediate computers and other equipment may be utilized for purposes of accumulating results from multiple machines and delivering such results to a remote facility. Of course in such arrangements appropriate steps are taken to secure the communications and encrypt the data so as to prevent unauthorized interception or tampering therewith.

In the exemplary arrangements the machine 10 is programmed with suitable circuit executable instructions to cause the machine to provide from the output devices, user selection options for user selections in contests which the user is eligible to select. This may include, for example, in the case where the machine is operated as a voting terminal, options to vote for or against tax levies, referendums or other questions that may be presented to voters. In other situations the contests may include a vote for public office between multiple candidates. In still other arrangements, the voter contest selection options that are presented through the output devices may include numerous candidates for offices for which the voter is entitled to vote for a plurality of the candidates. In some exemplary arrangements where the machine is used to provide customer experience or customer satisfaction feedback, user contest selection options may include selections related to products or services the user has received or may wish to receive, customer experience ratings or other contest options that are presented to the user and which the user is enabled to select. In other arrangements the machine may be used to receive user selected contest options for awards, such as voting for athletes to be named to an all star team or actors or movies to receive awards. Of course it should be understood that these contest selection option scenarios are exemplary and in other arrangements, other approaches may be used.

Figure 6:
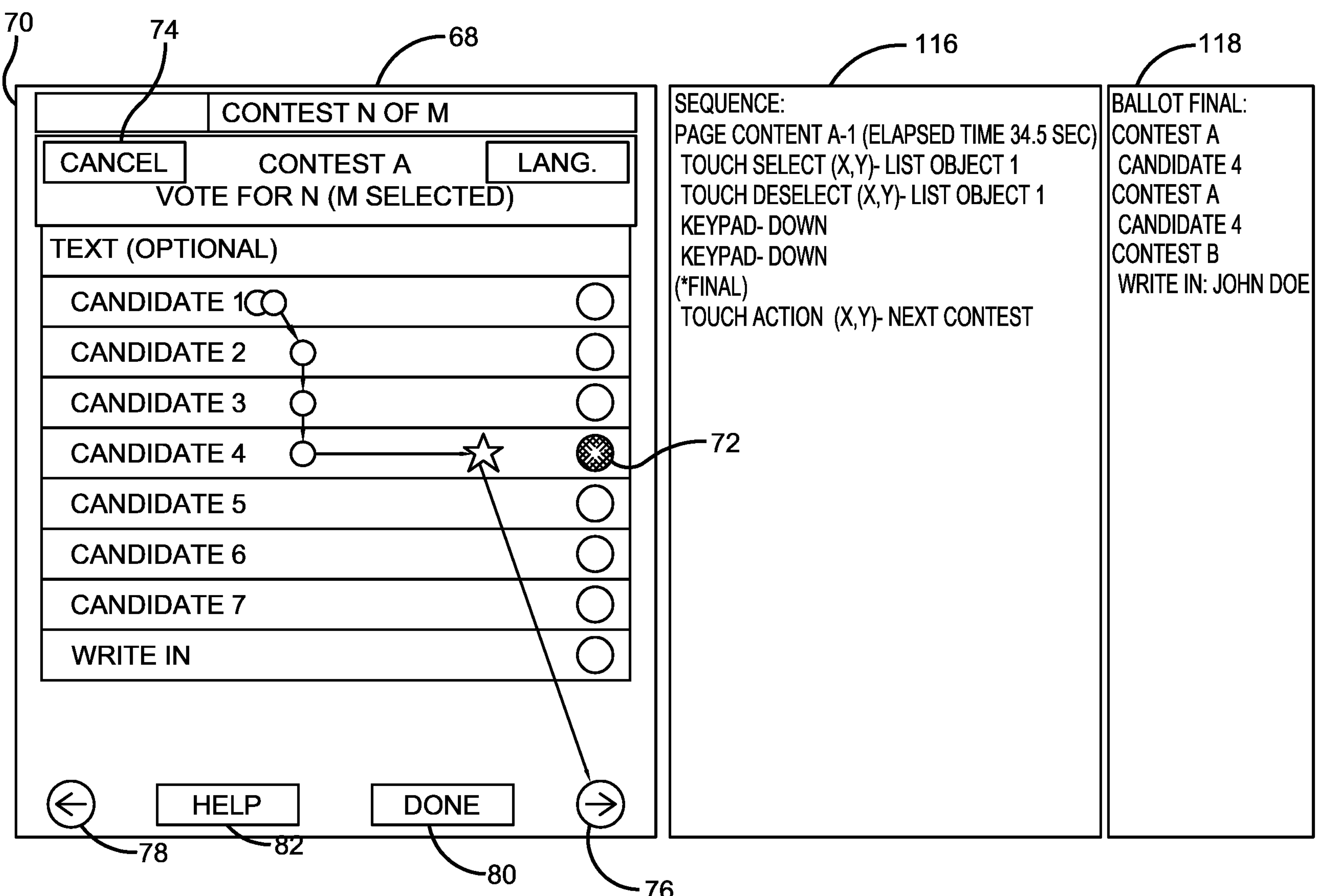
FIG. 6 is a schematic view of a machine and user interactions therewith along with graphical representations of the user/machine interaction data as may be output through the display in connection with an audit or recap.

FIG. 6 shows an output screen 68 as representative of the format of voter selection content options that are output through the display 14. Screen 68 displays a plurality of candidates for which the voter is entitled to vote. As can be appreciated, the voter selection options generally indicated 70 would represent the actual names of the candidates on actual ballots.

In response to the output voter contest selection options, the machine is operative to receive user contest selection inputs. Such inputs may be presented through the particular input device being utilized by the user. For example if the user is operating the machine to provide the voter option selection inputs via the touch screen sensing overlay 16, the voter may provide a touch screen selection input by touching the screen with a finger in the area corresponding to the particular option for which the voter wishes to vote. As shown in the screen portion shown in FIG. 6, the voter is shown as having provided a contest selection input related to candidate 4. The exemplary machine operates to indicate via an icon 72, the user's contest option selection input. Of course it should be understood that this approach is exemplary.

In other arrangements as the user operates the machine through other types of input devices, other types of inputs may be received. For example, in machines that may provide a display but not a touch screen overlay, the user may operate the machine through use of the keypad 18. In such arrangements, the user may provide inputs to cause the display to bring focus to a particular display object associated with a user selection contest option for a particular contest. This may include, for example, highlighting a particular candidate name or voter selection. Highlighting the particular user selection option provides the user with a frame of reference concerning which they are able to provide a user contest option selection input. In exemplary arrangements, the user may operate the keypad to scroll down a list of contest selection options so as to remove focus from one option and place focus on other options. In exemplary arrangements, the user may provide an input through the keypad or other input device so as to indicate the user contest selection of a particular option. In response to the receipt of such an input, the exemplary machine provides an icon or other indication of the user selection similar to icon 72 previously discussed.

In exemplary arrangements, other input devices such as the binary input device connected to interface 36 and/or the eye tracking cameras 34 may be utilized to provide user inputs so as to make user contest option selections. Of course this may be done for example in the case of a sip and puff device by applying mouth pressure or vacuum to a device operated by the user. Other binary input devices such as a foot pedal or gel switch can be utilized to provide further inputs so as to make further contest option selections by pressure or other movement. Likewise eye tracking inputs such as gazing at a particular user contest selection and then selecting it via blinking or other suitable inputs may be utilized.

Further as can be appreciated for blind users, the audio outputs may be provided through the headphones 56 or other suitable output devices to inform the user of the user selection contest options. In such arrangements the user may provide suitable inputs through at least one input device such as the keypad to indicate the user's contest selection. Further audio outputs may be utilized to advise a user of the contest selections made so as to verify that the user has voted or otherwise made user selections as they wish. Of course these approaches are exemplary and in other arrangements, other approaches may be used.

In addition to outputting user contest selection options, the exemplary machine also provides the user with machine instruction options. These machine instruction options enable the user to control the operation of the machine so as to have presented to the user all of the different user selection contests and options for which they are entitled to make selections, such as to cast a ballot. In addition, the screen instruction options may be utilized to allow the user to change their mind about the particular contest selection option that they wish to select. Further machine instruction options enable the user to start the machine session and terminate the machine session and to enable the machine to perform the other functions associated with receiving user selections.

For example, in some exemplary arrangements the display outputs from the screen include indicia that instruct the user to start their machine session by inserting a data bearing record such as the card 32 into the card reader 30. The user doing this starts the user's machine user session. Alternatively in other arrangements, the user may start the user session by having the user or an attendant such as a poll worker operate the machine to read a data bearing record such as a bar code from an article or a ballot. Further in other arrangements, the user may start the user session by providing inputs through one or more input devices of other types. Such an input represents a machine instruction input that causes the machine to operate to carry out the programmed action which corresponds to the user input corresponding to a particular machine instruction input.

Further examples of machine instruction options are represented in screen 68 in FIG. 6. For example, screen 68 includes voter instruction options that enable a user to cancel a voting selection that they have made in providing a contest option selection input. This may bedone, for example, by a user selecting the cancel icon 74. Further machine instruction options which are presented by the user in exemplary screen 68 include the ability of the user to select an arrow icon 76. Icon 76 is a forward arrow icon which when selected causes the machine to present to the user a different display screen which includes outputs of the user contest selection options for the next user contest that is to be presented to the user. This is a next voter contest in this exemplary arrangement. The exemplary screen 68 further includes a back arrow icon 78. The back arrow icon 78 enables a user to cause the machine to return to presenting the user contest selection options from a prior user contest that a user may wish to revisit for purposes of reviewing their prior selection or changing a selection such as reviewing a vote or changing their vote.

The exemplary output screen 68 in FIG. 6 further includes machine instruction outputs which enable the user to provide an input indicating that they have completed making selections by providing a user machine instruction input corresponding to the "done" icon 80. Generally in exemplary arrangements providing a user instruction input corresponding to the done icon will cause the machine to operate to present one or more screens which advise the user of the contest selection inputs they have provided and ask the user if they wish to submit the selections as final such as to cast their ballot including those selections. Further machine instruction inputs from the user enable the user's selections or ballot to be finally recorded with those selections. Another machine instruction output option which a user may select is shown in screen 68 includes a help icon 82. Input of a machine input which corresponds to the selection of the help icon causes the exemplary arrangement to provide the user with information and a tutorial on the operation of the machine. Of course it should be understood that these machine instructions option outputs are only a subset of those which may be generally offered in an exemplary machine.

For example in some exemplary arrangements, the user is offered machine instruction options related to canceling their user session, which a user may select if they have determined that they do not wish to provide selections or if there is some problem that results in the user wanting to discontinue their session without their selections being recorded. Alternatively as previously discussed, the user session can end with the machine presenting to the user, a machine instruction option to cast their ballot or otherwise make their input selections final. The user providing a machine instruction input in response to such an output causes the user's contest selections as input to the machine to be recorded as final selections such as votes. Further in still other arrangements where the machine is operated to mark user's contest selections on a data bearing record such as a paper ballot, the user may provide a machine instruction input which causes a printer such as the printer 28 to produce a paper ballot with the indicated selections or alternatively in some arrangements, to mark the user's contest selections as input to the machine on the user's pre-printed paper ballot.

Of course it should be understood that these types of machine instruction output options which are presented to a user at a machine and the actions carried out by the machine in response to user inputs selecting such options are exemplary. In other types of machines and apparatus, different types of machine instruction options and user inputs may be provided. For example in some arrangements, the user may be able to move display objects such as candidate names or other options in selected positions by scrolling the screen on the display. In other exemplary arrangements, the user may be able to move display objects to different positions on the display to indicate the user's contest selections. Various different options may be presented depending on the particular configuration of the machine that is utilized.

In the exemplary arrangement the machine is not only operative to record the user's contest option selection inputs but also to record in correlated relation therewith user/machine interaction data which occurs during the user's session. In the exemplary arrangement, the user/machine interaction data includes data that describes each interaction that the user has with the machine during their user session. The data also includes records of the output user selection options and machine instruction options that are presented to the user in response to which the user has provided their user inputs.

In the exemplary arrangement, the circuit 38 includes a timer 84 which may be integral with the processor chip 40 or a separate circuit component. The timer 84 provides a time indication associated with each user/machine interaction event during the user session. In the exemplary arrangement, the timer 84 is operative to indicate an elapsed time from the start of the user's session when each user/machine interaction event occurred.

In the exemplary arrangement, the user/machine interaction data is recorded and stored during the user session so that every user interaction with the machine is documented. Further, the user/machine interaction data is stored in correlated relation after the user session with the user selections that in the exemplary arrangement correspond to the votes cast by the user during a voting session. In the exemplary arrangement, the user/machine interaction data and the user contest selection data are stored in at least one data store in the machine in a secure and encrypted manner to prevent tampering. Further, as later discussed, the data files including the user/machine interaction data as well as the user contest selection data is digitally signed through operation of the circuitry 38 with a private key portion of an asymmetric key pair to help insure the integrity of the data and that it has not been tampered with as well as to verify that the data was produced by the particular machine. Of course these approaches to assuring the integrity and origin of the data are exemplary and in other arrangements, other approaches may be used.

In an exemplary arrangement, the user/machine interaction data includes for each user/machine interaction the elapsed time that the interaction occurs after the start of the user session. This is determined through operation of the timer 84. The exemplary user/machine interaction data for each interaction event further includes output data. The output data identifies at least one output from the at least one output device responsive to which the particular user input was received. This includes for example, in the case of a visual screen that is displayed on the display of the machine, the particular screen identifier associated with which the user selection input was received. For example, in exemplary arrangements, the output data for a screen may include a ballot style, a geographic area such as a precinct, and/or data which identifies the particular voting contest or display object that is output to a user in response to which the user input has been received.

Further, in some exemplary arrangements, the accuracy of the output data that is recorded as having been provided to a user is further verifiable by the circuitry calculating and storing one or more mathematical results produced using values of the output data, such as processor instructions that cause the output to be presented to the user. For example, in some exemplary arrangements, the circuitry may operate to calculate a mathematical result based on the instructions and pixel values such as a sum of certain pixel values which cause the output screen presented to the user. The mathematical result which may be alternatively referred to as a checksum, uniquely corresponds to the particular output screen. Because the mathematical result is recorded as part of the output data and is associated with the user/machine user interaction data, it can be verified that the indicated output screen presented to the user that in response to which the user provided a user contest selection input, is the output screen that the machine was programmed to present to the user. This data can be used to confirm the user did not provide their user contest selection input in response to some different screen output. Of course it should be understood that this output data is exemplary and in other arrangements, other types of output data may be included in the user/machine interaction data.

Other data that is recorded as part of the user/machine interaction data in the exemplary arrangement is input data describing the user interaction with the respective input device to cause the detected user input. In exemplary arrangements involving a touch screen, the input data may include location data corresponding to a location of user finger contact with the touch screen overlay. In exemplary arrangements, the location data may include data corresponding to x,y coordinates at locations on the face of the display. Further in exemplary arrangements, the location data may include display screen offset data of the display screen output or a display object associated with the input data. The display screen offset data may correspond to a scrolled position of the particular display screen that is output at the time that the user selection input is received. This may apply, for example, in some arrangements where the user is enabled to scroll or move the screen or display elements within the screen in the course of making their user selections. Recording the offset data enables determining the exact orientation of the screen or object on the display at the time the user provided their user input. This enables recording of exactly what output configuration was being presented through the display of the particular screen when the user provided their user input and thereby to determine how the user's contact with the screen correlates to what was being output therefrom.

Likewise in other arrangements where input devices such as a keypad is being utilized in connection with providing input data, the input data describing the user interaction which is generated and stored as part of the user/machine interaction data may include button data. The button data may indicate the particular button or buttons that are manually actuated by the user. In such arrangements, the machine user interaction data includes records specifying the button that is actuated and the time associated with the button actuation. Similarly, in other arrangements, for example when a bar code reader is being used as the input device, the input data may include data corresponding to the particular bar code that is read from a data bearing record as well as the elapsed time in the user session which corresponds thereto. Similarly in the case of an input device in the form of a card reader that reads a data bearing record such as a card to start the user session, the input data includes the card data that is read. The card data in the case of a card that is used to commence a user session will be associated with a zero elapsed time in the user session.

Likewise, with other input devices such as devices that are connected to the binary input interface, data concerning inputs is recorded. For example for a sip and puff input device, the input data may include each sensed input provided by the user providing mouth pressure or vacuum to the device. The user/machine interaction data indicates the time and nature of each detected sip and puff input which is correlatable with the output data to which such inputs are received. Other types of input data may be recorded for other types of binary input devices. Likewise, for machines that include eye tracking cameras or similar devices, data corresponding to the user's actions such as eye positions, time length of gaze at a particular contest selection option, or visual output object, blinking activity or other event which corresponds to input data that can be detected by the machine, is included therein. Of course it should be understood that these approaches are exemplary for the types of input devices that are described, and other arrangements may include other input data describing the user's interaction with the respective input device to cause the detected user input to be recorded as part of the user/machine interaction data.

Further in exemplary arrangements, the user/machine interaction data includes action data. The action data describes a resulting action taken by the at least one circuit of the machine responsive to the particular user input. The action data may include, for example, the activity of the machine gaining or losing focus of a particular contest selection option in response to a user selection. In addition, the action data may include the user making a selection or a deselection to change the outputs from the machine to present the user with a new set of output user contest selection options. Further in exemplary arrangements the action taken by the circuitry may include actions such as to record user option selection inputs that are currently posted to the machine as user selections such as votes. Other action data may be for the circuitry to operate to cancel the user session in cases where a user has provided input data electing to cancel the session. For machines that operate to print or mark data bearing paper records such as paper ballots, the action data may include the operation of the circuit causing the machine to print a paper ballot including indicia corresponding to the user option selection inputs. Of course it should be understood that these action data items are exemplary and in other arrangements other approaches may be used.

Figure 3:
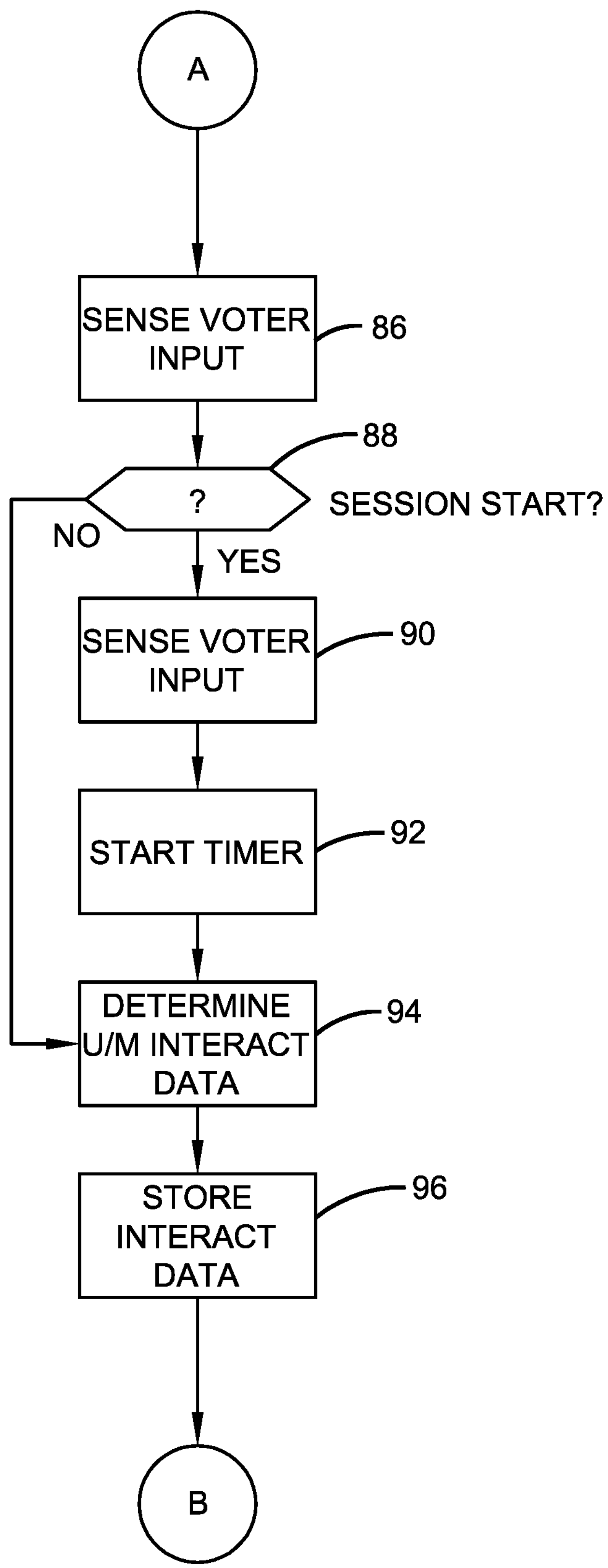
FIGS. 3 and 4 are simplified exemplary logic flow diagrams associated with the operation of an exemplary machine in recording user contest selections and user/machine interaction data.
Figure 4:
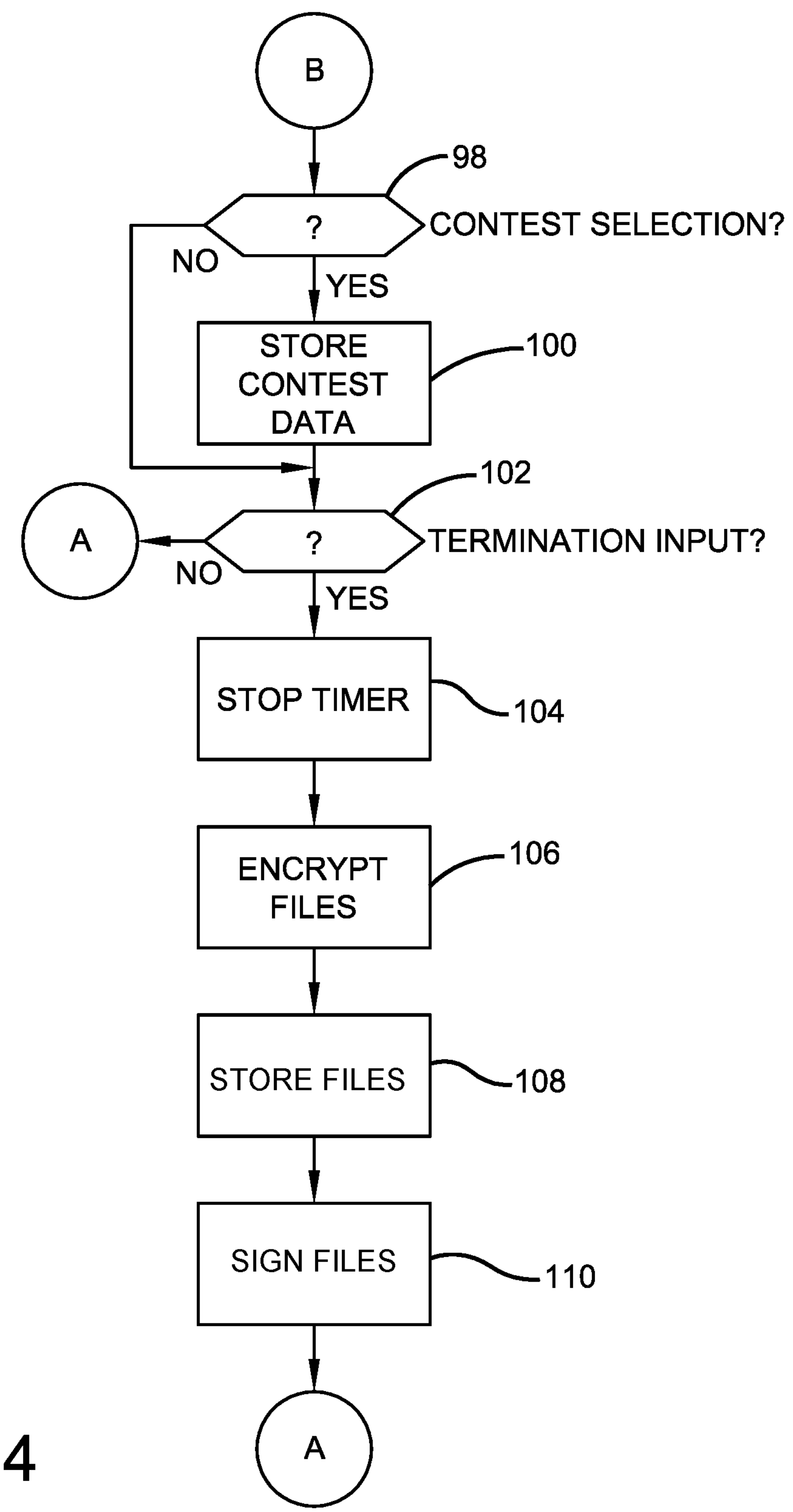

FIGS. 3 and 4 include a high level schematic logic flow carried out by an exemplary machine operating to record user contest option selections in correlated relation with user/machine interaction data. As represented in FIG. 3, the circuit 38 operates to detect a user input to the machine as represented by a step 86. In response to the detection of a user input at step 86, the machine circuitry then operates to make a determination as to whether the type of sensed user input corresponds to an input which starts a user session. This may correspond to reading of a data bearing record such as the input of a card into a card reader, or the reading of a bar code, or some other user input or combination of inputs as previously discussed. The determination as to whether the input is one which starts a session is reflected by a step 88. If the detected input is one which starts the session, the machine circuitry operates to assign a session ID value to the user session as reflected in a step 90. The circuitry operates to store the user session ID in a session file or otherwise in memory in the at least one data store 42. The circuitry is also operative to start operation of the elapsed timer 84. This is represented by a step 92.

Regardless of whether the sensed user input corresponds to an input that starts a user session, the circuitry operates to determine the user/machine interaction data corresponding to the input. As previously discussed, in the exemplary arrangement the user/machine interaction data for each input includes the elapsed time since the start of the user session as determined through the operation of the timer 84. The user/machine interaction data further includes the output data identifying the at least one output from the operative output device responsive to which the user input was received, as well as input data describing the user interaction with the respective input device to cause the detected user input. The exemplary user/machine interaction data further includes action data describing a resulting action taken by the at least one circuit 38 responsive to the user input. The determination of the user/machine interaction data is represented by a step 94. Once the user/machine interaction data for the particular event is determined, the at least one circuit 38 is operative to cause the user/machine interaction data to be stored in the at least one data store in the session file related to the particular user session associated with the assigned session ID. The storage of the user/machine interaction data in the session file is represented by a step 96.

As represented in FIG. 4, the circuitry 38 next operates in accordance with its associated executable instruction programming to evaluate whether the received user input corresponds to a user contest option selection. This is represented by a step 98. The user contest option selection for example, may correspond to a vote for the particular option in cases where the user does not change the selection prior to ending the user session in a manner that casts the user's ballot. Because the selection at least on a preliminary basis may eventually represent a vote, the data corresponding to the contest data selection is caused to be stored in a contest data file for the session as represented by a step 100. Of course as previously discussed, the programming of the exemplary arrangements enables users to review and change contest selection options in accordance with user inputs in response to machine instruction options that are presented to the user. It should be understood that while these particular actions by the at least one circuit 38 are not represented in this simplified logic flow, such options are provided to the user in exemplary arrangements.

The circuitry then operates to determine if received user input corresponds to a termination input. This is represented at a step 102. A termination input corresponds to an input to end the user's session. This includes, for example, a user input that cancels the user's voting session without casting any votes. The termination input may also include an input by a user to indicate that they are done and wish to make their selections final such as by casting their ballot with voting selection options that they have selected through operation of the machine. For some types of machines, such as those that are operative to print the user's selections on a paper record such as paper ballot, a termination input may also include an instruction to print the user's selections on the paper ballot. Of course it should be understood that in various arrangements, other different types of termination inputs may apply.

If in a step 102 it is determined that the currently resolved user input is not a termination input, the logic flow returns to the beginning with the circuitry continuing to operate to sense the next user input to the machine. The process repeats, entering the user/machine interaction data and the time associated therewith for each sensed user input to the machine during the user session. Of course if the user input corresponds to a selection of a user contest selection option, then the input is recorded in the contest data file as selection data related to a contest. It should be appreciated that the contest data file also includes the session ID of the exemplary arrangement which, as can be appreciated, enables the later correlation of the recorded user's contest selections with the user/machine interactions that occurred during the user session.

If in the step 102 the input that is received from the user corresponds to a termination input, the exemplary circuitry is operative to stop the timer from further counting time as part of the user session. This is represented by a step 104.

In the exemplary arrangement, the at least one circuit 38 is operative to encrypt the content of the data files which include the user's selections such as votes (if such selections or votes are recorded) as well as the user/machine interaction data. Of course it should be understood that if the user session has been cancelled, there will be no contest selection data corresponding to user elections and the contest data file will include no user selections or votes. Nonetheless in exemplary arrangements, the user/machine interaction data file will be maintained and stored in correlated relation with the contest data file which includes only the session ID. Of course these approaches are exemplary.

With the user/machine interaction data files and contest selection files now complete, the files are encrypted as represented at the step 106 and stored at a step 108. Thereafter the encrypted files are digitally signed as represented by step 110. In exemplary arrangements the machine has stored in the data store associated therewith, one or more public and private keys which correspond to asymmetric key pairs. Such asymmetric key pairs enable data encrypted using the private key of the pair to be decrypted only by the corresponding public key of the pair, and vice versa. In exemplary arrangements, the circuitry is operative to encrypt the user/machine interaction data and the contest selection data using asymmetric key encryption so that the file may only be decrypted by an authorized computer which has been provided access to the corresponding public key. Further the signature process represented by step 110 corresponds to digitally signing the encrypted files through mathematical manipulation with the private key portion of the asymmetric key. This process enables the recipient of the file to further verify the genuineness of the file and that the data was generated by the particular machine by verifying the signature through communications with a certificate authority which issued the key. The certificate authority is able to assure the recipient of the file that the signature applied thereto is genuine because it corresponds to the signing data issued by the certificate authority. This further helps to assure that received files including the data were originated by the machine and have not been tampered with. Of course it should be understood that this approach is exemplary and in other arrangements, other or additional processes may be utilized to insure the integrity of the data.

As represented in a step 110, the exemplary logic flow is completed with the circuit 38 operating to store and digitally sign the user/machine interaction data files for the session and the contest selections recorded as data bearing records in the at least one data store 42 of the machine. These exemplary files are stored in correlated relation by virtue of both files including the session identifier associated with the particular user session. Of course as can be appreciated in this exemplary arrangement, the session identifier includes no data that can be used to identify the particular user. Likewise in the exemplary arrangement, the timer 84 operates as an elapsed timer which applies only to time since the initiation of the particular user session. The time data of the exemplary arrangement does not provide the current time of day data so as to enable someone to determine the identity of the particular machine user. Of course it should be understood that these approaches are exemplary and in other arrangements other approaches may be used.

FIG. 5 shows some examples of the user/machine interaction data that may be stored in the session file and how it is interpreted. For example, the user/machine interaction data that is represented by data element 112 includes a series of alphanumeric values arranged in accordance with the programming of the circuit 38. The alphanumeric values as represented correspond to output data for Ballot Style 2 presented for Precinct 456 and Contest ID 132. This output data value indicates what output the machine was presenting to the user at the time of the user interaction event. The next value included in the data element which is separated by a colon represents the time since the start of the user session that the particular event occurred. In this case, the event is recorded by the timer as 10.865 seconds after the initiation of the particular user session.

The next value included in the data element 112 corresponds to the input data for the particular event. In this case, a touch screen interface is being used and the input data described for the user interaction with the touch screen input device corresponds to a touch at x,y coordinates 234/789. This describes the exact location on the touch screen where the user provided the contact with the display. Also included with the input data is an indication that at the time that this input data was received, there was no scroll offset associated with the screen data that was being presented.

The action data associated with the data element 112 indicates the selection event. The selection event as represented by the letter "x" indicates that the action taken by the circuitry is a rejection event and that the machine reacted in response thereto. This collection of user/machine interaction data provides sufficient information to indicate the screen display that was being output to the user at the time of the selection, the time since the session start when the user provided the input, the location of the input on the touch screen, and what the machine did or recorded in response to the input. It should be understood that the data included in the data element 112 is exemplary and in other arrangements, additional data such as checksum values or other verification information for the output screen or other available data which caused the machine to recognize the user inputs, may also be included in the user/machine interaction data.

Data element 114 represents another example of an element of user/machine interaction data. In this particular example, the element is associated with operation of the machine where output data is provided through a screen and input data is provided through a keypad. As represented under the data element 114 in FIG. 5, the output data identifying the output from the screen at the time of the user interaction, corresponds to Ballot Style 2, Precinct 456 and a Contest ID of 245. The user interaction with the machine occurred 20.5 seconds after the user session was initiated. The input data corresponds to a button scroll down input to a scroll button on a keypad. The option data describing the resulting machine action for this data element was for the machine to provide focus on item 4 in the list of selection options output to the screen. Of course as previously discussed, the elements for the user/machine interaction data are exemplary and in other arrangements, other approaches may be used.

Figure 7:
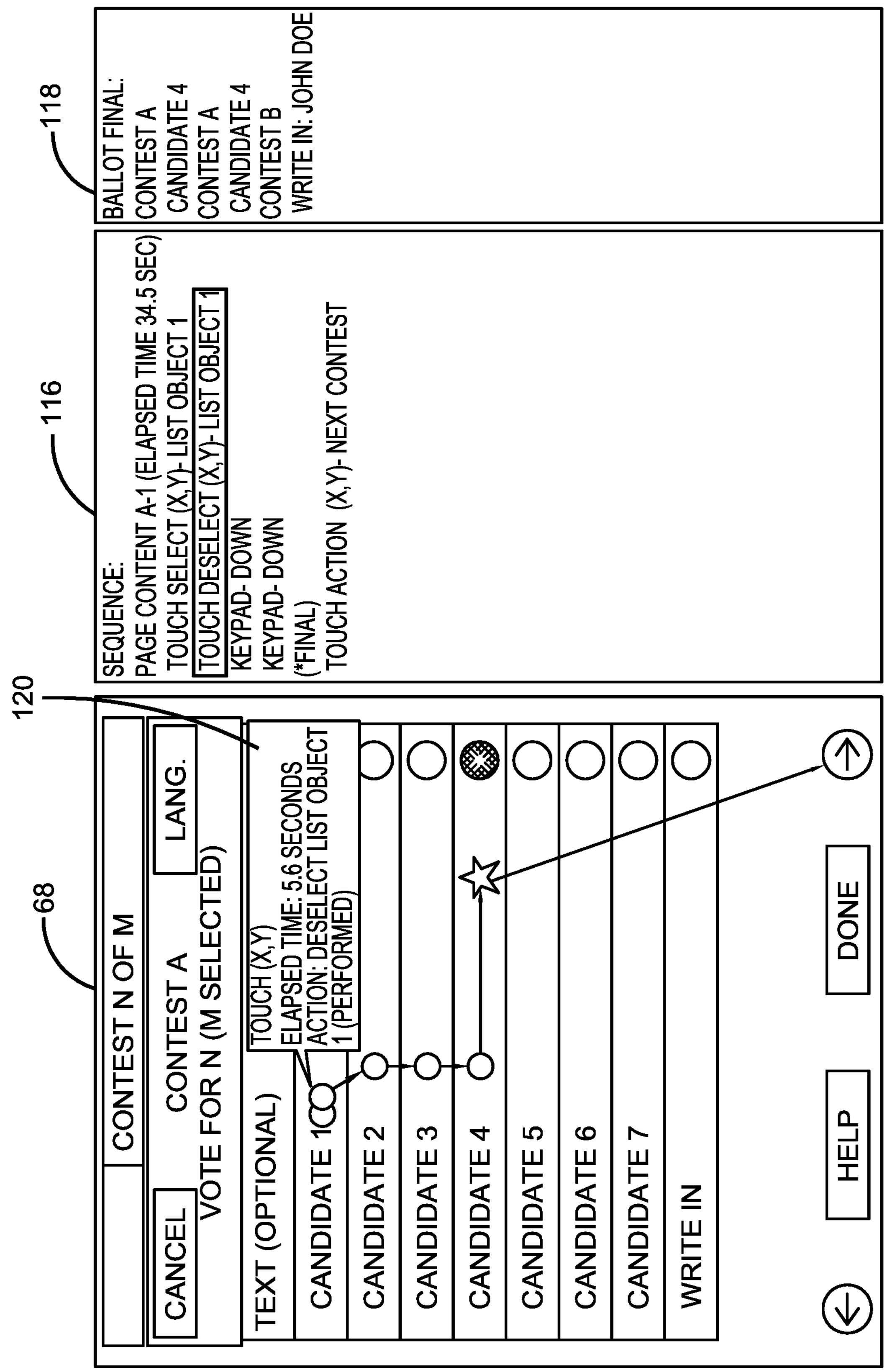
FIG. 7 is a view similar to FIG. 6 which shows an exemplary arrangement of data that may be displayed in connection with a selection user/machine interaction event.

FIGS. 6 and 7 contain graphic representations of the screen outputs from a machine and the user/machine interaction data and contest selection data which may be recorded in connection with the user operation of the exemplary machine. In this exemplary arrangement, the machine is operated with input devices that include both a touch screen and a keypad. In this exemplary arrangement, the user is enabled to navigate the display screen 68 using both a keypad and a touch screen. This is represented herein for purposes of providing an example which explains the user/machine interaction data that may be associated with multiple input devices. Generally in most arrangements, a user will utilize one input device for navigating and providing user selection option inputs to the machine.

The exemplary arrangement shown in FIG. 6 includes the user/machine interaction data associated with screen 68 in a graphic file representation 116. This may be done by circuit executable instructions which provide a graphic rendering of user/machine interaction data. The user's contest options are represented in a graphic file representation 118. The file representations 116 and 118 in FIG. 6 correspond to a graphic rendering of the raw data such as the example data elements 112 and 114 previously described which are included in the user/machine interaction data files.

The exemplary file representations 116 and 118 may be rendered responsive to the stored data files and may be generated in connection with activities such as auditing the accuracy of the machine so as to assure that a user's inputs are properly recorded as sections by the machine such as votes. Alternatively or in addition, the graphic representations that are shown in FIGS. 6 and 7 may be generated and analyzed in connection with an audit activity, for example, a recount for a particular voting race. In such situations it is desired to review user interactions with the machine to verify that the machine properly recorded a user's contest option selection inputs as votes, and in cases where a vote was not recorded, that the user did not provide an input to the machine that represents an intent by the user to cast a vote which was not recorded by the machine as a vote. In exemplary arrangements, the executable instructions that comprise the rendering tool that produces the graphics and markings shown in FIGS. 6 and 7 in some arrangements may be operative on the machine through the programming associated with the circuitry 38. In other arrangements, the instructions comprising the rendering tool may be operative on a separate computer or other device which receives the files from the machine and which is used for purposes of conducting an audit function such as a recount. Further it should be appreciated that in the exemplary arrangement, the machine and/or audit or recount computer may be operative to selectively provide and render the user/machine interaction data for only selected user selection contests. In this manner, a recount or audit may be conducted only for the particular contest which is subject to the audit or recount.

As represented in FIG. 6, the exemplary programmed instructions which present the graphic representations 116 and 118 shows a sequence of user interactions with the machine. As represented by the output in file representation 116, the contest which corresponds to screen 68 was presented to the user at 34.5 seconds after the initiation of the user session. The user interacted with the touch screen by touching at the x,y coordinates corresponding to list object 1, which in this example is candidate 1. Thereafter, the user touched the touch screen again to deselect candidate 1. The graphic outputs then show that the user utilized the keypad to scroll down twice past candidates 2 and 3 listed, and then provided a touch screen input which corresponds to the selection of candidate number 4. After selecting candidate number 4, the user then selected icon 76 to cause the machine to move to display contest selections for the next contest. The graphic file representation 118 further shows that for this contest A, the contest selection file shows that the user cast their vote for candidate number 4.

Also in the exemplary arrangement, programmed instructions associated with the rendering tool are operative to provide a sequential graphical representation of the user's actions in connection with the output screen. This is shown overlaid on screen 68. The information shown corresponds to the user initially selecting via the touch screen the x,y coordinates of candidate 1, deselecting candidate 1, scrolling in response to button inputs past candidate 2 and candidate 3. Thereafter, the graphical representation shows the user provided a touch screen input corresponding to the selection of candidate 4. In accordance with the rendering tool, arrows indicate the sequence of events as they occur and the star icon indicates the user selection. The rendering tool further provides outputs on a display which indicates via the arrow that after making the user selection, the user selection to move on to other contests by touching the next page icon.

As represented in FIG. 7, the exemplary arrangement further enables the rendering of additional information regarding each user/machine interaction that is reflected in the file representation 116. For example in this exemplary arrangement, a reviewing user is enabled to highlight each particular entry that corresponds to an event in the user/machine interaction data. In response to selecting the particular event, additional information is provided graphically in corresponding relation with the graphical representation of the event on the display 68.

In this exemplary arrangement, a reviewing user selects the event which is the deselection of list object 1 which is candidate 1. In response to these activities, the computer executable instructions corresponding to the rendering tool cause a graphic to appear associated with the graphic feature which corresponds to the event. This is represented by the graphic bubble 120. Graphic bubble 120 provides the user/machine interaction data for the particular selected event in the sequence. Specifically, in the case of the deselection event, the bubble indicates the touch coordinates by the user which are represented by (x, y) in the graphic. The bubble also includes the elapsed time in the user session when the deselection event occurred. The bubble further indicates the action corresponding to the event which is the deselection of object 1 or candidate 1. Such data is available through operation of the exemplary rendering tool for each user/machine interaction for which data is recorded by the machine. Of course it should be understood that this approach to providing the user/machine interaction data and facilitating the corresponding user actions to which the data relates, is exemplary and in other arrangements, other approaches may be used.

As can be appreciated, the recording by the machine of the user/machine interaction data of the exemplary arrangement, facilitates reviews of the sequence of what the machine did and the user did in the course of operation. The recording of this data enables verifying that the machine presented the proper user contest option selections to the user for consideration, and how the user provided inputs in response thereto. The exemplary machine further enables a review of how the user operated the machine in connection with the user session and enables verifying that the user selections were properly recorded, or enables identifying any discrepancies. The exemplary arrangement enables ensuring proper machine operation and may reduce uncertainty as to the correct recording of user selections through operation of the machine. Of course these approaches that are described are exemplary and in other arrangements, other approaches consistent with the teachings presented herein may be used.

In other exemplary arrangements machines may be configured to capture and record data which can be used to help assure that one individual did not conduct undesirable activity such as voting multiple times in the same election. In such arrangements, the at least one circuit of the exemplary machine includes circuit executable instructions which operate to cause a camera, such as an eye tracking camera or other camera associated with the machine, to capture image data corresponding to at least a portion of each user conducting a using session at the machine. In exemplary arrangements the machine may operate to cause image data to be captured responsive to one or more inputs provided by the user to an input device of the machine. This may be for example, a user input which commences the user session or an input which finalizes the selections such as for example, the casting of votes in the particular voting session. In other exemplary arrangements multiple images of a user may be captured during a user session responsive to user inputs and/or responsive to other parameters such as elapsed time values. Such images may be combined or otherwise utilized to produce image data that uniquely corresponds to the particular user.

In some exemplary arrangements, the image data may correspond to a facial image of the user. In other arrangements the image data may correspond to an image of an iris of one or both eyes of the user, an image of one or more fingerprints or other visual or sensor perceivable biometric data that is uniquely associated with the particular individual. In some exemplary arrangements the circuit instructions may operate to capture multiple images to assure that the images captured are associated with a live individual by detecting for movement, changes in facial expression or other features of the individual to assure that the images captured are not of a photograph or of a mask. In other exemplary arrangements, the executable instructions may operate to capture image data that can be used to assure that facial features are captured which cannot be obscured by readily changed items such as glasses, hats, makeup, hairstyles, shadows or other features which might otherwise result in not capturing image data that uniquely identifies a particular individual. Of course these approaches are exemplary and other or additional techniques may be used.

In the exemplary arrangement the executable instructions associated with the at least one circuit are operative to produce a mathematical result based on the image data. The mathematical result uniquely corresponds to the image of the particular voter. The result may be produced by mathematical operations using pixel data or other image data associated with one or more captured images. Such image data may also be subject to processes to enhance the contrast or other properties of the image or images to help assure that the image data accurately reflects the appearance of a selected portion of the individual. In some arrangements the mathematical result may be produced by analyzing all or selected portions of the pixel data or other values which make up the image data. The exemplary arrangements are operative to produce a result that uniquely corresponds to the image data associated with the particular user who conducts the user session.

In exemplary arrangements the at least one circuit of the machine is operative to cause the result to be stored in the at least one data store associated with the machine circuitry. The result is stored in correlated relation with the user selections and the user/machine interaction data that corresponds to the particular user session. In exemplary arrangements the result data may also be subject to encryption and digital signing techniques like those previously discussed to help to assure that the data is genuine and has not been subject to tampering.

In exemplary arrangements where the machine is operative to receive user selections such as votes that are cast as a secret ballot, the approaches utilized to produce the result data are configured to assure that the result data cannot be used to determine the identity, appearance or other features of the individual who cast the associated votes. This is accomplished in exemplary arrangements by utilizing mathematical manipulations of the image data to produce a result that cannot be reversed or otherwise analyzed to resolve the identity of the particular individual who cast the associated votes.

In exemplary arrangements the at least one circuit associated with the machine, or a separate computing device, may be utilized for purposes of verifying based on the stored result data, that each user session conducted at the machine was carried out by a different individual. Further in exemplary arrangements where an authorizing authority such as a jurisdiction utilizes the same approaches for producing results from user sessions carried out at each of a plurality of machines in the jurisdiction, the data can be analyzed to verify that no individual voted more than one time in a particular contest or election at different machines. Generally except in rare situations where identical twins have voted in the same contest or election, the exemplary system will operate to verify that each user session was carried out by a different individual. Of course in situations where it appears that an individual conducted multiple user sessions, the suspect impropriety or voter fraud may be identified by the computer identifying the same result being associated with multiple user sessions, and the circumstances thereof can be investigated. Of course these approaches are exemplary and in other arrangements other approaches may be used.

Thus the exemplary machine that is controlled at least in part to data bearing records and its methods of operation that have been described herein achieve desirable capabilities, eliminate difficulties encountered in the use of prior devices and systems and attain the useful results described herein.

In the foregoing description, certain terms have been used in connection with describing the exemplary arrangements for purposes of brevity, clarity and understanding. However, no unnecessary limitations are to be implied therefrom because such terms are used for descriptive purposes and are intended to be broadly construed. Moreover the descriptions and illustrations herein are by way of examples and the innovations represented are not limited to the particular features shown and described.

Further it should be understood that elements, features, relationships, devices or other aspects described in connection with one exemplary arrangement may be utilized in connection with other exemplary arrangements such that numerous different arrangements, functions and capabilities can be carried out. Numerous different aspects of described arrangements may be used together or in different combinations to achieve useful results.

Having described the features, discoveries and principles of the exemplary arrangements, the manner in which they are constructed and operated, and the advantages and useful results attained, the new and useful structures, devices, elements, arrangements, parts, combinations, systems, equipment, operations, methods, processes and relationships are set forth in the appended claims.

I claim:

1. A method comprising:

a) outputting from at least one output device in operative connection with a voting machine, selectable voter contest selection options, b) receiving responsive to user interaction with at least one input device in operative connection with the voting machine, at least one voter contest selection input that corresponds to at least one of the output voter selectable voter contest selection options, c) storing in at least one data store in operative connection with the voting machine, voter selection data corresponding to the at least one voter contest selection input received through the at least one input device, and user/machine interaction data for each received voter contest selection input, including i) output data identifying an output from the at least one output device responsive to which the respective voter contest selection input is received, ii) input data describing detected user interaction with the at least one input device which received the respective voter contest selection input, and iii) time data associated with receipt of the respective voter contest selection input.

2. The method according to claim 1, and further comprising:

d) responsive at least in part to receiving the at least one voter contest selection input in (b), taking a resulting action through voting machine operation, wherein (c) further includes storing in the at least one data store iv) action data identifying the resulting action.

3. The method according to claim 1, and further comprising:

prior to (a), receiving through the at least one input device, at least one instruction input corresponding to a voting session start, and operating a timer to begin elapsed time operation responsive at least in part to the at least one instruction input, wherein in (c)(iii) the time data corresponds to an elapsed time since the voting session start.

4. The method according to claim 1, and further comprising:

outputting a selectable user/machine instruction option through the at least one output device, receiving responsive to user interaction with the at least one input device, a user/machine instruction input that corresponds to the output user/machine instruction option, responsive at least in part to the received user/machine instruction input, subsequent to (a), outputting from the at least one output device at least one changed selectable voter contest selection option, wherein (c) further includes storing in the at least one data store iv) input data describing detected user interaction with the at least one input device which received the respective user/machine instruction input, and v) time data associated with receipt of the respective user/machine instruction input.

5. The method according to claim 1 wherein the at least one output device comprises a display, wherein in (c)(i) the output data includes at least one output screen identifier.

6. The method according to claim 5 wherein in (c)(i) the at least one output screen identifier corresponds to at least one of a ballot style, a geographic area, a voting contest.

7. The method according to claim 1 wherein the at least one output device comprises a display, wherein (a) includes outputting voter contest selection options in an output screen through the display, wherein in (c)(i) the output data includes a mathematical result of values included in data instructions operative to cause outputting of the output screen.

8. The method according to claim 7 wherein in (c)(iii) the mathematical result comprises a sum of a plurality of pixel values.

9. The method according to claim 1 wherein the at least one input device comprises a touch screen, wherein in (c)(ii) the input data includes location data corresponding to a location of user contact with the touch screen.

10. The method according to claim 9 wherein in (c)(ii) location data includes x, y coordinates corresponding to the location of user contact.

11. The method according to claim 9 wherein in (a) the selectable voter contest selection options are included in a display screen that is output through the touch screen, wherein in (c)(i) the location data includes at least one scroll offset value for the display screen.

12. The method according to claim 1 wherein the at least one input device includes a keypad including a plurality of manually actuatable buttons, wherein in (c)(ii) the input data includes button data indicative of a manually actuated button of the keypad.

13. The method according claim 1 wherein the at least one input device includes a bar code reader, wherein in (c)(ii) the input data includes a read bar code.

14. The method according to claim 2 wherein in (a) the selectable voter contest selection options include a display object, wherein in (c)(iv) the action data includes at least one of the display object gaining focus or the display object losing focus.

15. The method according to claim 1, and further comprising:

outputting a selectable user/machine instruction option through the at least one output device, receiving responsive to user interaction with the at least one input device, a user/machine instruction input that corresponds to the output user/machine instruction option, responsive at least in part to the received user/machine instruction input, outputting from the at least one output device at least one of a changed selectable voter contest selection option, a further selectable user/machine instruction option, wherein (c) further includes storing in the at least one data store iv) further input data describing detected user interaction with the at least one input device which received the respective user/machine instruction input, and v) time data associated with receipt of the respective user/machine instruction input, vi) further output data corresponding to at least one of the changed selectable voter contest selection option and the further selectable user/machine instruction option.

16. The method according to claim 1, and further comprising:

prior to (b)

receiving responsive to user interaction with the at least one input device, an initial voter contest selection input that corresponds to an initial one of the output voter selectable voter contest selection options, and then receiving responsive to user interaction with the at least one input device, a deselection input that corresponds to the initial one of the output voter selectable voter contest selection options, and wherein (c) further includes storing in the at least one data store iv) input data describing detected user interaction with the at least one input device that received the initial voter contest selection input, v) time data associated with receipt of the respective initial voter contest selection input, vi) input data describing detected user interaction with the at least one input device that received the deselection input, vii) time data associated with receipt of the respective deselection input.

17. The method according to claim 1, and further comprising:

prior to (a), receiving through the at least one input device, at least one instruction input corresponding to a voting session start, and operating a timer to begin elapsed time operation responsive at least in part to the at least one instruction input, wherein in (c)(iii) the time data corresponds to an elapsed time since the voting session start, d) receiving through the at least one input device, at least one voting session termination input, e) stopping elapsed time operation of the timer responsive at least in part to the at least one voting session termination input.

18. The method point of claim 17 wherein in (d) the at least one voting session termination input corresponds to at least one of an input canceling the voting session, an input causing at least one vote to be cast, an input causing indicia to be printed on a paper ballot.

19. The method according to claim 1, and further comprising:

d) subsequent to (c), encrypting and digitally signing at least one of the voter selection data and the user/machine interaction data.

20. The method according to claim 1 wherein a camera is in operative connection with the voting machine, and further comprising:

operating the camera to capture image data corresponding to an image of a portion of a user from which at least one voter contest selection input is received through the at least one input device, producing a mathematical result using the image data, wherein the mathematical result uniquely corresponds to the image, storing the result in the at least one data store in correlated relation with at least one of the voter selection data and the user/machine interaction data.

21. A method comprising:

a) receiving at least one instruction input corresponding to a user session start through at least one input device in operative connection with a voting machine, b) operating a timer to begin elapsed time operation responsive at least in part to the at least one instruction input, c) outputting through at least one output device in operative connection with the voting machine, user contest selection options and machine instruction options, d) receiving user option selection inputs through the at least one input device, e) responsive at least in part to at least one machine instruction input received through the at least one input device, outputting through the at least one output device, changed user contest selection options and machine instruction options, f) determining for each received user option selection input and each machine instruction input, user/machine interaction data associated with the respective user input, including output data identifying at least one output from the at least one output device responsive to which the user input is received, input data describing user interaction with a respective input device to cause detection of the received user input, an elapsed time since the user session start at which the user input was received, g) storing in correlated relation in at least one data store in operative connection with the voting machine, data corresponding to the user option selection inputs and the user/machine interaction data corresponding to the user session.

22. A method comprising:

a) receiving at least one voting session initiation user input through at least one user input device in operative connection with the voting machine, b) operating a timer to begin elapsed time operation responsive at least in part to the voting session initiation input, c) outputting through at least one output device in operative connection with the voting machine, user voting contest selection options, d) receiving user voting contest option selection inputs through the at least one input device, e) determining for each user voting contest option selection input, user/machine interaction data associated with the respective user voting contest selection input, including output data usable to identify at least one output from the at least one output device that includes the user voting contest selection options responsive to which the respective user voting contest option selection input is received, input data usable to describe the user interaction with the respective input device to cause detection of the received user voting contest option selection input, and an elapsed time after the at least one voting session input at which the respective user voting contest option selection input is received, f) storing in correlated relation at least one data store in operative connection with the voting machine, data corresponding to the user voting contest option selection inputs and the user/machine interaction data corresponding to the user voting session.

23. At least one machine readable storage medium having non-transitory instructions stored thereon that when executed by circuitry of a voting machine are operative to cause operations comprising:

a) outputting from at least one output device in operative connection with the voting machine, selectable voter contest selection options, b) receiving responsive to user interaction with at least one input device in operative connection with the voting machine, at least one voter contest selection input that corresponds to at least one of the output voter selectable voter contest selection options, c) storing in at least one data store in operative connection with the voting machine, voter selection data corresponding to the at least one voter contest selection input received from the voter through the at least one input device, and user/machine interaction data for each received voter contest selection input, including i) output data identifying an output from the at least one output device responsive to which the respective voter contest selection input is received, ii) input data describing detected user interaction with the at least one input device which received the respective voter contest selection input, and iii) time data associated with receipt of the respective voter contest selection input.

24. The at least one medium according to claim 23, wherein the operations further include responsive at least in part to receiving the at least one voter contest selection in (b), taking a resulting action through voting machine operation, wherein (c) further includes storing in the at least one data store vi) action data identifying the resulting action.

* * * * *